(12) United States Patent
King et al.

(10) Patent No.: US 7,336,569 B2
(45) Date of Patent: Feb. 26, 2008

(54) OPTICAL DISK TRACKING SERVO CIRCUIT ENABLED TO COMPENSATE FOR NON-CONTINUOUS TRACK SEGMENTS OR PROLONGED DEFECT

(75) Inventors: Francis K. King, San Jose, CA (US); Jeffrey Liu, San Jose, CA (US)

(73) Assignee: Dcard, Inc., Milpitas, CA (US)

( * ) Notice: Subject to any disclaimer, the term of this patent is extended or adjusted under 35 U.S.C. 154(b) by 518 days.

(21) Appl. No.: 10/887,985

(22) Filed: Jul. 9, 2004

(65) Prior Publication Data
US 2005/0270942 A1 Dec. 8, 2005

Related U.S. Application Data

(60) Provisional application No. 60/577,237, filed on Jun. 3, 2004.

(51) Int. Cl.
*G11B 7/00* (2006.01)
(52) U.S. Cl. .................................... 369/44.29
(58) Field of Classification Search ............ None
See application file for complete search history.

(56) References Cited

U.S. PATENT DOCUMENTS 5,671,203 A * 9/1997 Ra .......................... 369/53.23
6,381,201 B1 * 4/2002 Shihara et al. ............ 369/32.01
6,549,492 B1 * 4/2003 Song ......................... 369/44.29
6,552,971 B2 * 4/2003 Iida .......................... 369/44.29
6,876,613 B2 * 4/2005 Byun et al. ............... 369/53.15
2003/0012106 A1 * 1/2003 Kobayashi ................ 369/53.23
2003/0048706 A1 * 3/2003 Kobayashi ................ 369/44.26

FOREIGN PATENT DOCUMENTS

JP 05062369 A * 3/1993

* cited by examiner

*Primary Examiner*—William Korzuch
*Assistant Examiner*—Peter Vincent Agustin
(74) *Attorney, Agent, or Firm*—Bo-In Lin

(57) ABSTRACT

The invention pertains to an improvement for a tracking and focusing servo and defect management circuit that controls the tracking and focusing of an optical head on an optical media in an apparatus for reproducing a data, sound or image recorded on the optical media. The invention characterizes by the provision of a circuit for managing modulation of an RF signal from the optical pickup head caused when the optical pickup head encounters a non-continuous track in segment arrangement or a very long extended defect such as a extended flaw in the disc resulted discontinuous track segment thereon, and an adjusting circuit which manages the loop gain of the tracking servo circuit per the track arrangement of defect detection and a tracking profile, whereby the responsiveness of the optical pickup head is improved and track skipping prevented or recovered.

12 Claims, 12 Drawing Sheets

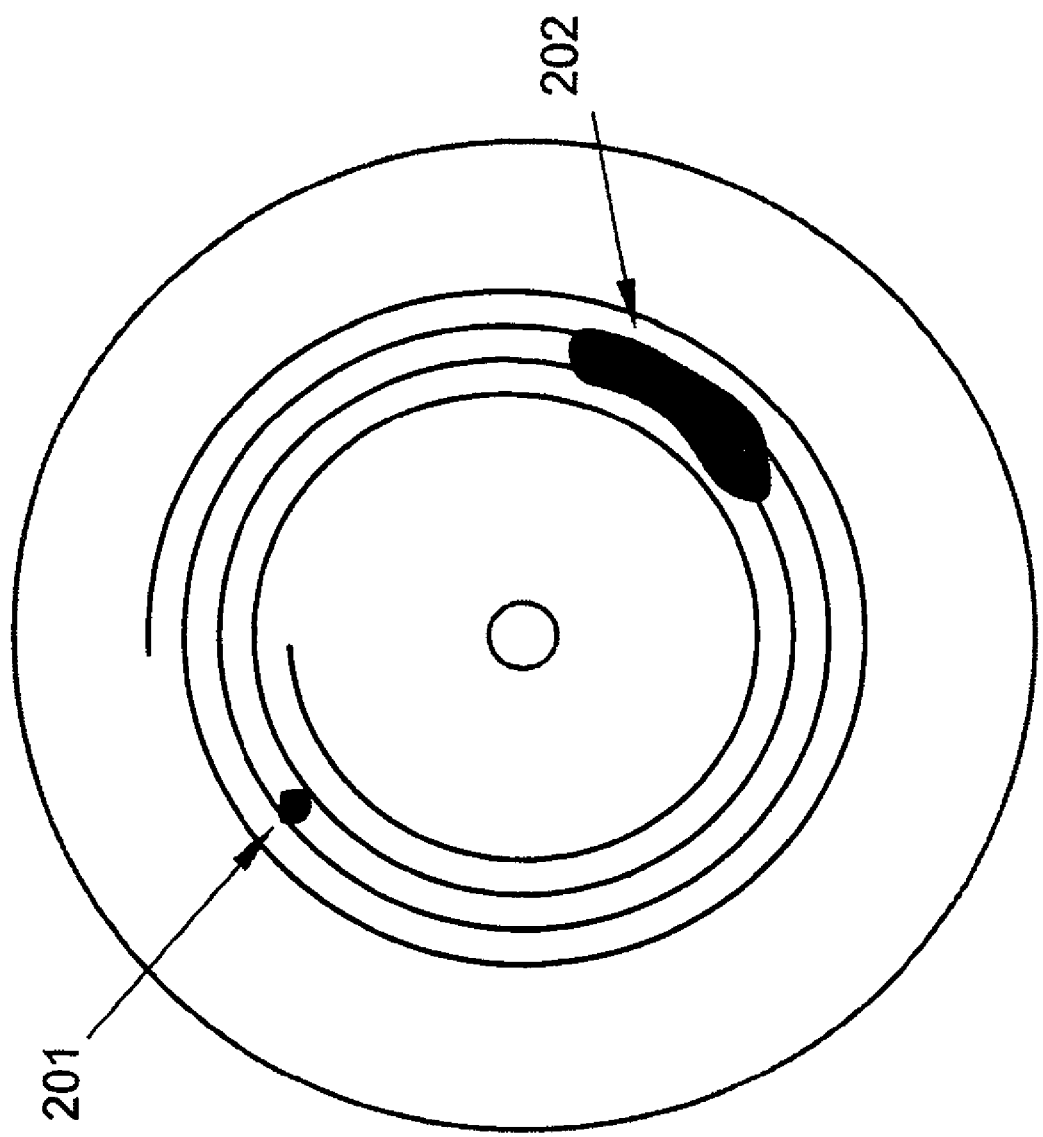

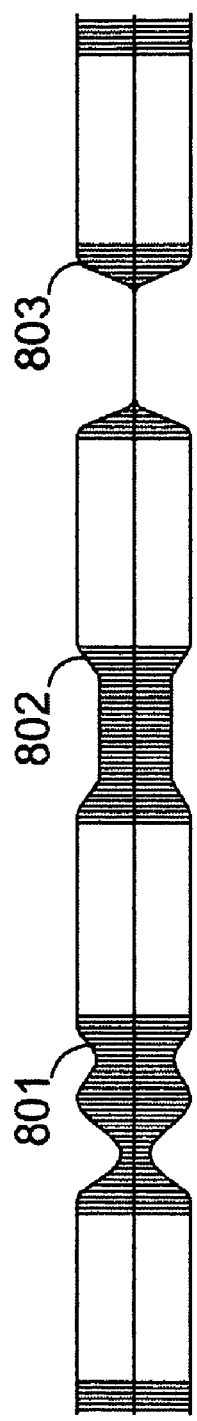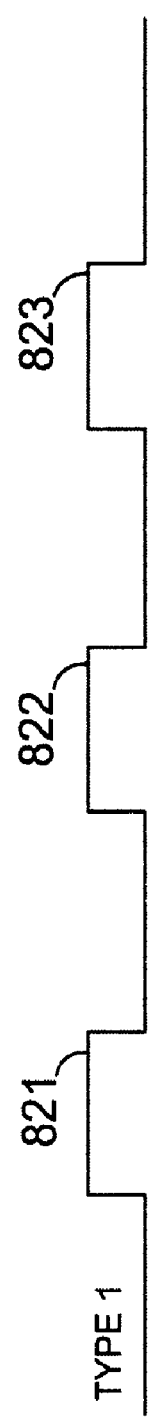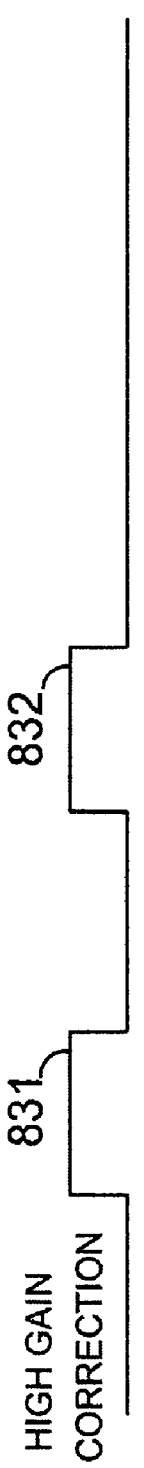
Fig. 8A  Fig. 8B  Fig. 8C  Fig. 8D  Fig. 8E

OPTICAL DISK TRACKING SERVO CIRCUIT ENABLED TO COMPENSATE FOR NON-CONTINUOUS TRACK SEGMENTS OR PROLONGED DEFECT

This application claims priority to pending U.S. provisional patent application entitled OPTICAL DISK TRACKING SERVO CIRCUIT ENABLED TO COMPENSATE FOR NON-CONTINUOUS TRACK SEGMENTS OR PROLONGED DEFECT filed Jun. 3, 2004 by Francis King and accorded Ser. No. 60/577,237, the benefit of its filing date being hereby claimed under Title 35 of the United States Code.

BACKGROUND OF THE INVENTION

1. Field of the Invention

This invention relates generally to systems and method for control an optical pickup head for reading data from and writing data to data storage medium. More particularly, this invention is related to an improved method for optical disk tracking servo and focusing servo circuits enabled to compensate for non-continuous track segments or prolonged defect data tracks.

2. Description of the Prior Art

Conventional techniques of servo control and the compensation for errors that occurs during the processes of reading data from a data track are limited by an intrinsic assumption of these compensation algorithm that the servo control is relying on a normal track data-reading feedback to restore a normal operational mode. Without such a normal feedback signal, the whole servo control scheme fails and the data reading process stops. Conventional technologies of servo control implemented for controlling the pickup heads are therefore unable to deal with a data-recording medium that has a large defective area covering a length of the data recording tracks exceeding certain threshold length or discontinued data tracks where a pickup head is caused to wait indefinitely for the normal feedback signals before a normal servo control mechanism can function properly.

Specifically, optical discs are recording media for storing data, e.g., video and/or audio information, on their surfaces in the form of spirally track with pits and land information. The reproduction of recorded information on such optical discs is through an optical pickup. The optical pick-up shines a light ray, e.g., a laser beam, to track along the spiral-recording track and converts the reflected light into an electrical signal. A servo control mechanism is implemented to control the motion and positioning of the pickup head. The control mechanism is provided to control the objective lens or a mirror of the optical pickup device when moved by a stepping motor with lead screw or a linear motor to position the pickup head on the right track with precisely controlled focus on the data track to retrieve the data from a designated point on a designated data track.

FIG. 1 shows a typical conventional optical data storage and access system. An optical pickup head 102 projects a laser beam on a rotating optical media 101. An optical signal from the optical medium 102 is reflected and received by the optical pickup head (OPU) 102 that converts the reflected light from the optical media 101 into electrical signals. A radio frequency (RF) circuit 103 produces a tracking error (TE) signal and a focusing error (FE) signal to the respective tracking servo and focus servo processing circuits 104 and 105. Each servo circuit receives error signals and applies the gain control and phase compensator to feed the control voltage to stepper or linear motor driver 118 and OPU 102 actuator driver. The servo management process (SMP) 109 sets the servo gain and receiving control profile for tracking and focusing from the OPU 102 drivers, e.g., the focusing driver 113, the tracking driver 115, the spindle motor driver 116, the stepper/liner driver 118 and the spindle motor 117, for further processing. Referring to FIG. 1 again, the tracking servo circuit 104 receives the tracking error (TE) as a decoded signal for inputting to the SMP 109. The SMP 109 then generates servo control correction signals to the tracking driver 115. Similarly, the focus servo circuit 105 receives the focusing error (FE) as a decoded signal for inputting to the SMP 109. The SMP 109 then generates focus control correction signals to the focusing driver 113. The conventional servo control system as shown in FIG. 1 is not able to handle large area defects or data read/write operations for data stored in the discontinued data track segments due to the limitation that a convention servo control must use servo feedback or reflected optical laser beam data unavailable at these areas.

Typical tracking servomechanism control methods are the so-called 3-spot method, push-pull method and Differential Phase Detection (DPD) method. A tracking or focusing error is determined from the intensity of reflected light or the like position on an optical disc by a spot light ray from an optical pickup. There are different techniques disclosed by several prior art patents to manage and correct the errors during the data reading process. Emoto disclosed in U.S. Pat. No. 4,687,916 "Dual beams Optical pick-up device for both focus and error tracking detection". In U.S. Pat. No. 4,703,468, Baba, et al. "Optical disc tracking servo circuit having compensation for disc defects and external disturbances" and U.S. Pat. No. 4,722,079, Matsumoto "Optical disk player capable of distinguishing external disturbances and local defects and adjusting servo gain accordingly" disclosed schemes to separate defects and external disturbance and servo corrections. In United States patent application 20010055247 Tateishi, Kiyoshi; et al. "Servo control apparatus for optical disc driver". In a United States Patent Application Publication 20030223335 Chen, Chih-Yuan "Method of defect detection for optical disc drives", and United States Patent Application 20030103425 Shidara, Kiyoshi "Optical disk apparatus" disclosed enhanced methods to improve the tracking servo control. In all cases, when the external disturbance is removed, the servo control circuit still expects to have the normal tracking feed back signals.

If the track defect is very long, see FIG. 3A, even with the defect mapping management method to map out the defect area to a different location, the available servo control methods can fail to keep or recover the optical pick-up to follow the prescribed track across the defect area and results a useless media. See FIG. 3, the track arrangement is non-continuously in track segments, the available servo control methods fails to keep the optical pick-up to follow the prescribed track across none available track area since no servo feedback signal is available.

Therefore, a need still exists to provide an improved data access device and CDROM, CDR, DVD and other data-card storage configurations that are compatible with the credit card size standard to process and store data therein such that more data can be available for card user authentication applications to overcome the above-mentioned difficulties and limitations.

SUMMARY OF THE PRESENT INVENTION

Therefore, an object of this invention is to provide new servo control circuits and control algorithms to overcome the above-discussed problems and limitations. The servo control circuits and control methods are provided to control the pickup head to continue a stable operation even when data tracks have a prolonged defect or the data tracks are non-continuous track segments.

Specifically, in order to achieve the objectives, this invention discloses an optical disc apparatus with a spindle motor for driving an optical pick-up (OPU) with servo control circuits. The servo control circuits receive control signals to control an optical beam and to drive an actuator for controlling a position of the optical beam on an optical disc. The servo control circuit comprising: a tracking error (TE), a Focusing error (FE) processing and defect detecting arrangement for detecting a defect or disturbance on the basis of reflected light of the optical beam from the optical disc. The servo control circuits further include an index or spindle FG input timing counter circuit, a servo tracking profiling circuit, memory devices for store timing and defect information, a storing device for tracking profile, error threshold adjusting circuits, tracking servo modulation circuits, focusing servo modulation circuits and servo management processor (SMP).

Defects occurring on account of dark spots, damages or others on the optical disc are detected from reflected light of an optical beam from the optical disc. When TE or FE detects an error signal that reaches the defect thresholds as that determined by the SMP, and additionally when the error signal detection can be repeated at the same location, a defect is recognized. The low gain at servo tracking is set to compensate servo tracking. The defect location timing and type is stored in memory. The servo control circuits are provided to deal with different kinds of defects. Defect type 1 considered a short and no extra servo modulation is needed. The servo control circuits manage a type-2 defect when the defect time is long. Additional servo tracking modulation with tracking profile becomes necessary. As TE or FE reaches a different threshold set by the SMP and does not repeat at the same location, an external disturbance is recognized. A high gain servo tracking is set.

For servo control to access data recorded on non-continuous data track segments, a starting track index and an ending index are provided to define the active track region. When SMP recognizes the OPU light beam is entering active track region, SMP activates normal servo control functions and deactivate normal servo control function yet activate special servo control with predicated tracking profile at the exit of active track region. Under the circumstances when there is no physical index is available. SMP is provided to derive such index with the timing counter circuit and the FE feedback circuit.

Therefore, the optical beam is controlled to better track a target position on the optical media, which leads to servo control with stability.

Briefly, in a preferred embodiment, the present invention discloses a tracking and focusing servo circuit for controlling the tracking and focusing of an optical pickup head on an optical media, wherein the control is affected with a tracking and focusing error signal and a loop gain control signal obtained from an RF signal generated from said optical pickup head. The tracking servo circuit comprises comparators adapted to compare a signal level of the RF envelopes signal with an adjustable reference level and produce defect detection signal. In a preferred embodiment, the comparators adapted to compare a signal level of the RF envelop signal with an adjustable reference level and produce external disturbance detection signal. In a preferred embodiment, the tracking servo circuit further includes a focusing servo circuit comprises comparators adapted to compare a signal level of the focus error envelop signal with an adjustable reference level and produce focus error detection signal. In a preferred embodiment, the tracking servo circuit further includes a storage circuit, timing circuit, and A/D and D/A converters to store and reproduce tracking servo profile. In a preferred embodiment, the tracking servo circuit further includes a circuit adjusting means for setting the loop gain of the tracking servo circuit at an adjustable gain different from a normal circuit gain, upon detection of defect. In a preferred embodiment, the circuit adjusting means for activating extended recovery tracking and focusing error defect management at extended defect than the normal defect detection and recovery procedure. In a preferred embodiment, the circuit adjusting means for activating the tracking and focusing management circuit in the non-continuous segmented track arrangement These and other objects and advantages of the present invention will no doubt become obvious to those of ordinary skill in the art after having read the following detailed description of the preferred embodiment, which is illustrated in the various drawing figures.

BRIEF DESCRIPTION OF THE DRAWINGS

FIG. 3A shows a small and a large defect in a spiral track.

FIGS. 8A,B,C,D,E show a RF signal envelop profile, defect type set up and servo gain control respective to defect types

DETAILED DESCRIPTION OF THE PREFERRED EMBODIMENT

Figure 2:
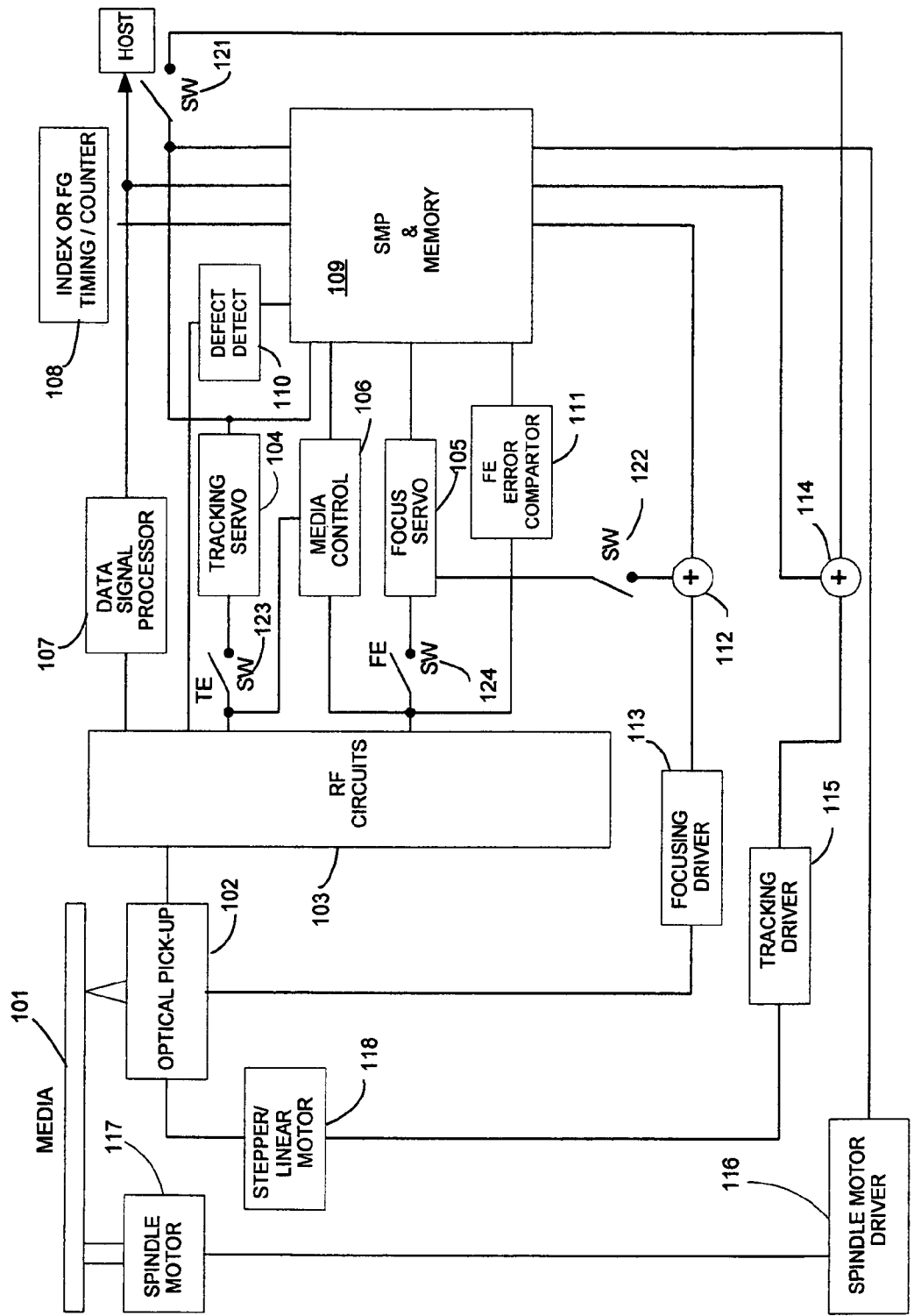
FIG. 2 is a functional block diagram for showing an exemplary servo control system of this invention.

Referring to FIG. 2 for an example of a servomechanism control circuit of this invention. An optical pickup head 102 projects a laser beam on a rotating optical media 101. An optical signal from the optical medium 102 is reflected and received by the optical pickup head (OPU) 102 that converts the reflected light from the optical media 101 into electrical signals. A radio frequency (RF) circuit 103 produces a tracking error (TE) signal and a focusing error (FE) signal to the respective tracking servo and focus servo processing circuits 104 and 105 respectively and more detail circuit configurations of the servo processing circuits 104 and 105 are described in FIGS. 4 and 5 respectively below. Each servo circuit, e.g., circuits 104 and 105, receives error signals and transmits the corrective signals to the servo-management, processor SMP 109. The SMP 109 then applies the gain control and phase compensator to feed the control voltage to stepper or linear motor driver and OPU 102 actuator driver. The servo management process (SMP) 109 sets the servo gain by either looking up a table of media property or using a dynamic calibration procedure as will be further described in FIGS. 4, 5, 6, 7, and 10 below. The control profile for tracking and focusing for OPU 102 power drivers are input to the SMP 109 for further processing and storage as further described in FIG. 7 and 10. The media management circuit 106 is implemented to indicate that the media is detected in the system using the signal as described in FIG. 5. The data signal process circuit 107 converts signal to data for host to use by SMP 109 through a host bus such as IDE/ATA, IDE/ATA serial, SCSI, or others as needed. The index or FG circuit 108 as described in FIG. 6 generates once around index and timing counter for the servo management processor (SMP) 109 as described in FIG. 7 and 10. A defect detection circuit 110 with more detail descriptions provided in FIG. 4 uses the threshold form SMP 109 to generate media detect signal and defect types back to SMP 109. Focus error circuit 111 uses the threshold set by SMP 109 as described in FIG. 5 to set focus error flag for SMP 109. An adder 112 combines modulated servo from SMP 109 in FIG. 7 or 10 and feedback from focus servo 105 to send a control signal to a driver 113 that controls the OPU 102 focus action. An adder 114 combines the modulated tracking servo from SMP 109 detailed in FIG. 7 or 10 and feedback from tracking servo 104 to send control signals to a driver 115 that controls the motor 118 and the tracking action of OPU 102. The SMP 109 controls the spindle motor 117 through the spindle motor driver 116. Compared to a conventional servo control system, a new defect detection circuit 110 is added to further modulate the control signals. As shown in FIG. 5, additional FE comparator 111 is implemented to control the focusing driver 113. This invention further uses a media control circuit 106 and SMP 6 to detect the media is in the device or not as shown in FIG. 5. This invention combines these added features with an index timing/counter circuits 108 as described in FIG. 6 and SMP 109 memory management circuit detailed in FIG. 7 and 10 to enable the servo control to manage media with large defects or discontinued track segments.

FIG. 3A shows a relative small defect area 201 and a very large defect 202 at an optical disc. The conventional servo method usually can manage a small defect such as 201 by reducing the servo gain. However, when there is a very large and long defect such as 202, it causes a conventional servo system to totally lose the servo stability since there is no tracking feedback across this large defect segment. A servo system of this invention as that shown in FIG. 2 is implemented to handle both a large and small defects, e.g., defects 201 and 202.

Figure 3B:
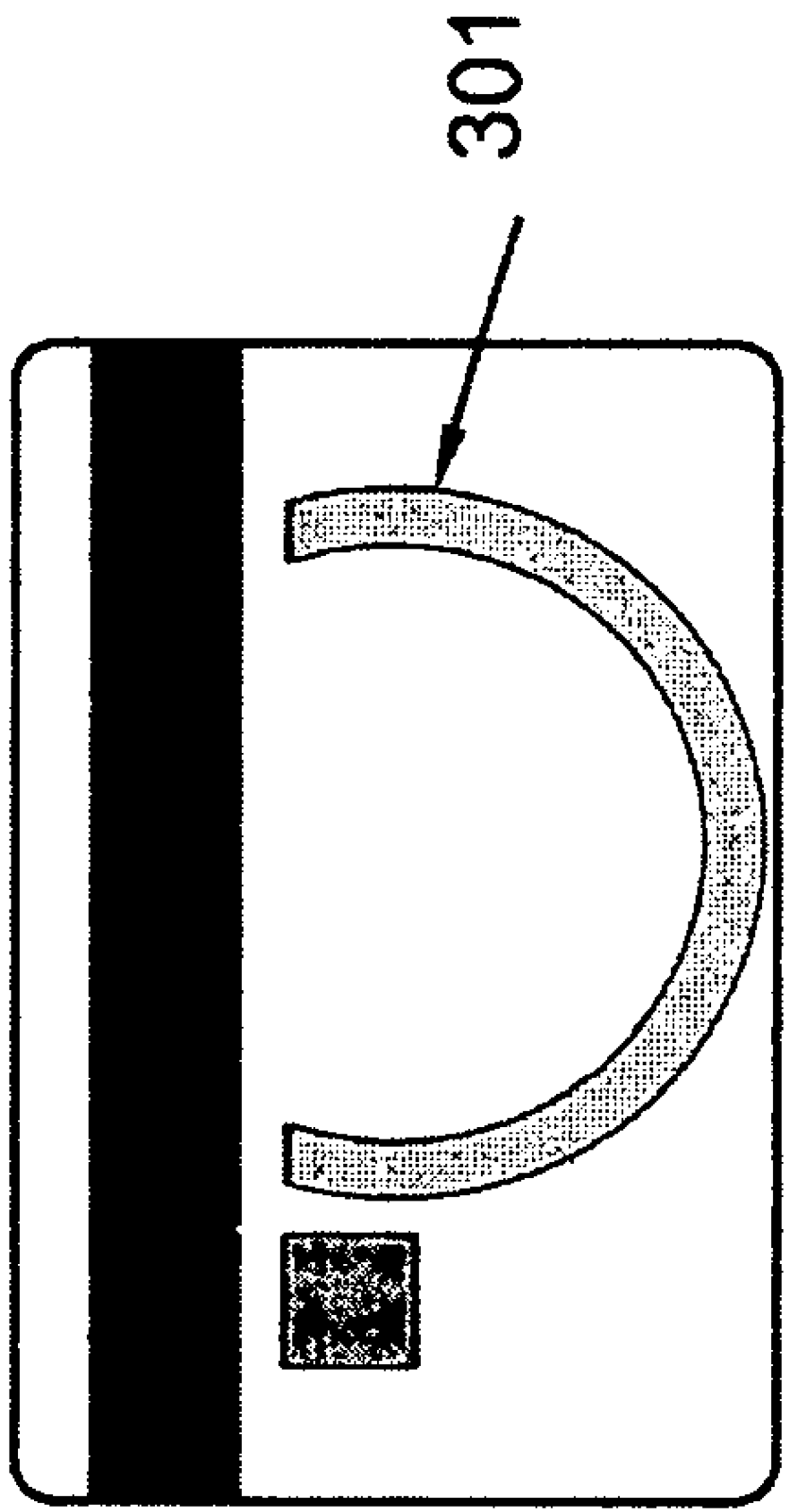
FIG. 3B shows non-continuous track segment arrangement.

FIG. 3B shows an optical media that has a non-continuously track segment arrangement 301. There is no tracking feedback outside this 301 region. Conventional servo control method has limited usefulness in dealing with data access operations for data stored on these segmented non-continuous data tracks. A servo control mechanism as disclosed in this invention is implemented to read and write data form and to the data track on a discontinued or segmented data storage medium 301.

Figure 4:
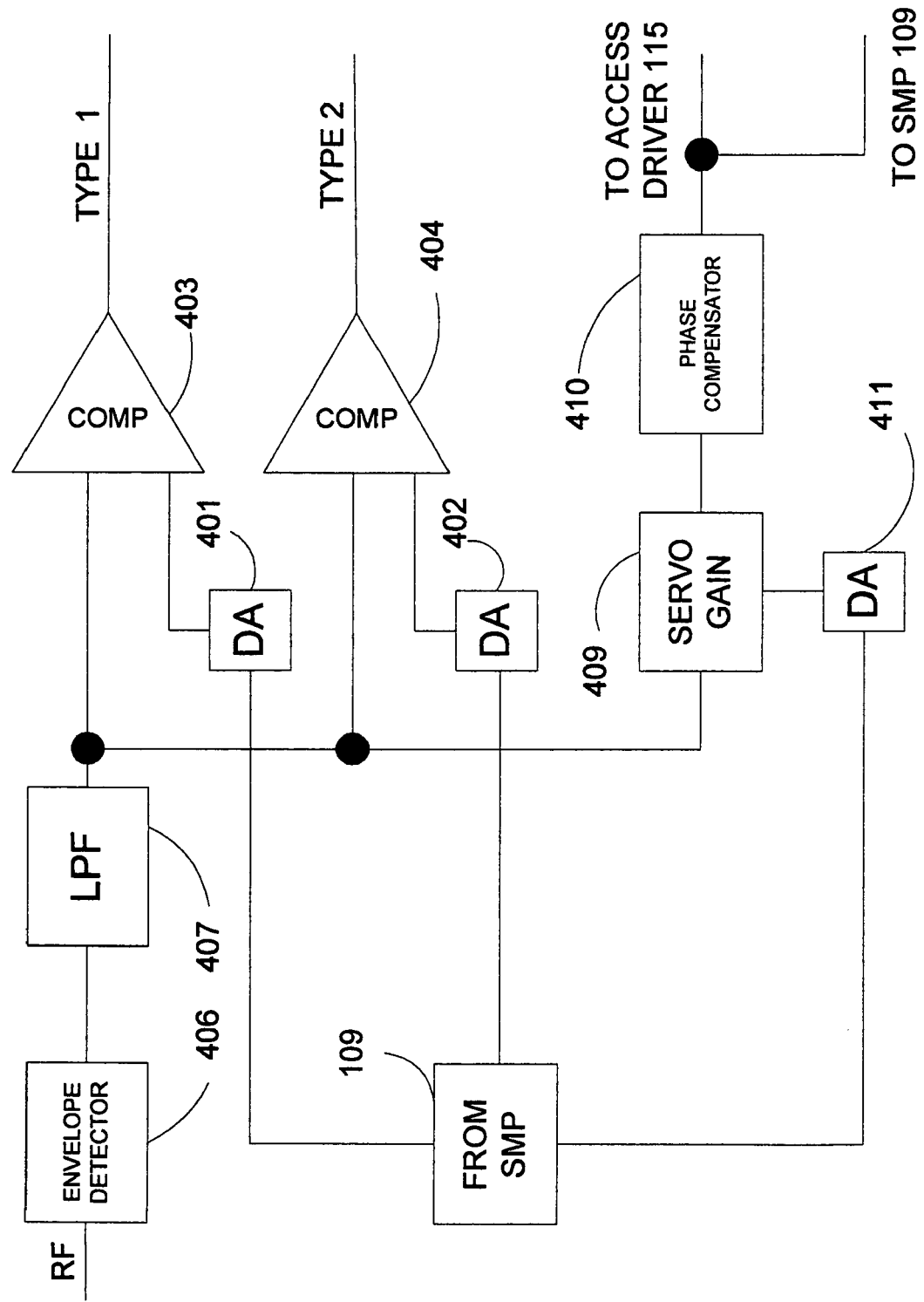
FIG. 4 shows RF signal to track error signal with adjustable thresholds comparators and to defect type signal.
Figure 5:
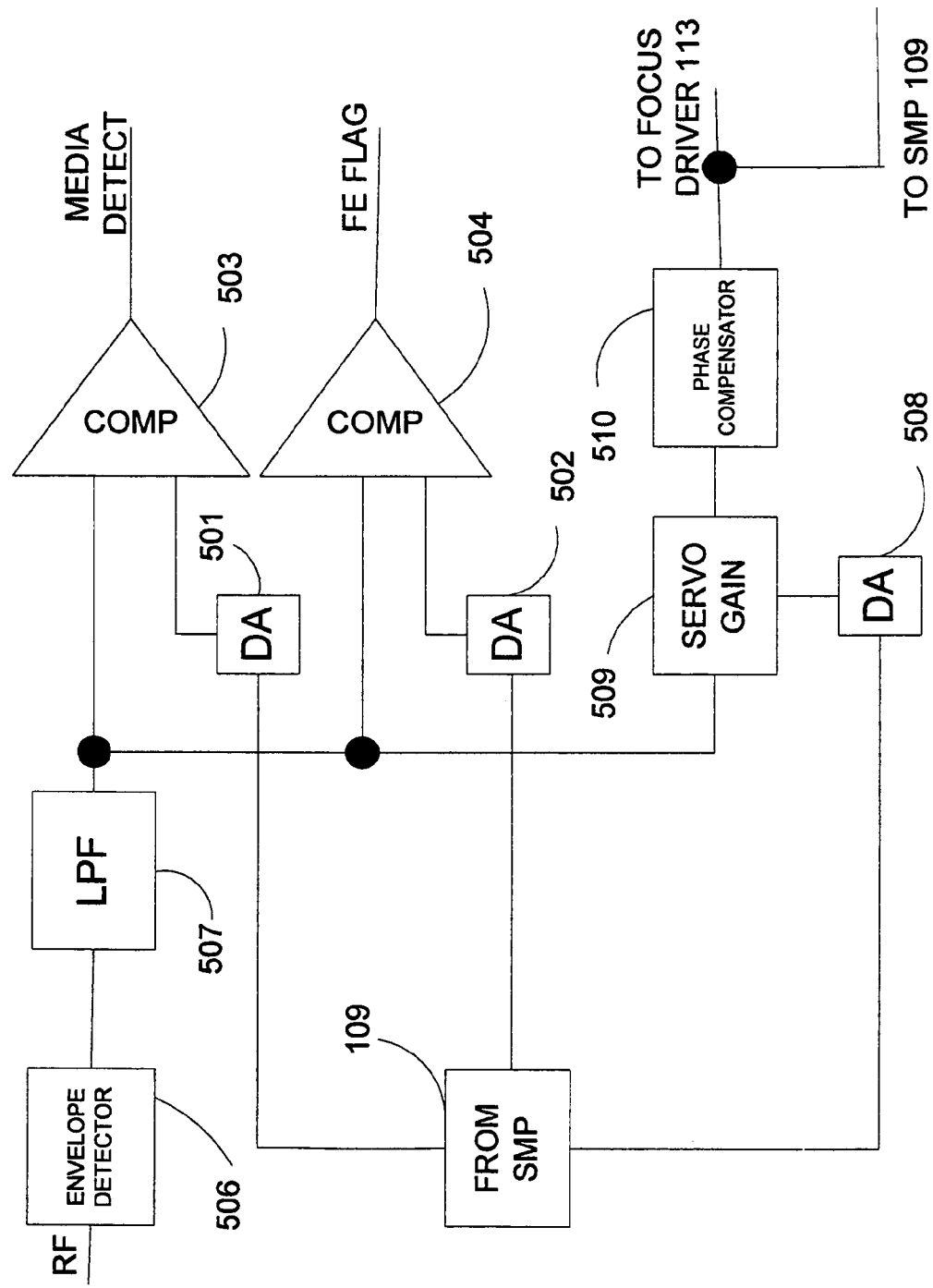
FIG. 5 shows RF signal to focus error signal with adjustable thresholds comparators and to focus error flag.
Figure 10:
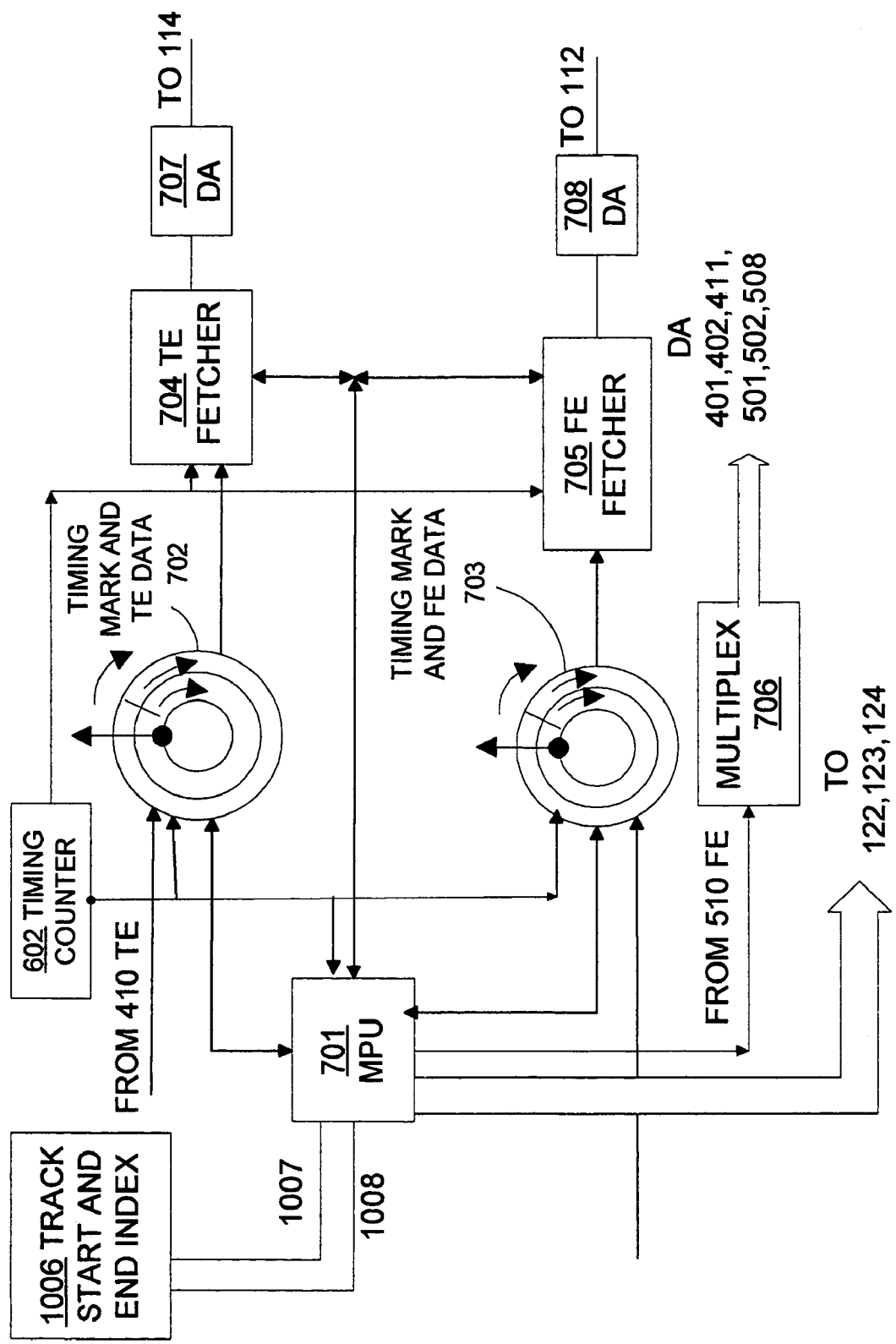
FIG. 10 shows a functional block diagram of servo management processor and memory arrangement in a non-continuously track segment configuration.

Shown in FIG. 4 is a detailed circuit of defect detect circuit 110 in FIG. 2 that includes a tracking error RF envelope detector 406 and low pass filter 407 feed the error signal to the SMP 109. This invention uses SMP 109 to set two D/A converters 401 and 402 at comparators 403 and 404 that define two types of defects, type 1 and type 2. The type 1 defect threshold is higher than type 2 defect-threshold and has a higher servo gain feedback to correct the error. When the SMP 109 received a type 2 defect, the SMP 109 activates a very low gain response using DA converter 411 or shut off the servo gain 409 and temporarily disable an operation in carrying out the servo corrections. The SMP 109 can also deactivate the tracking servo 104 by switch 123 during the track jump action. Signal at servo gain 409 and phase compensator 410 feeds to SMP and memory 109 for further processing as shown in FIGS. 7 and 10 that can provide further tracking servo modulation control in large defect or discontinued track segment environment.

FIG. 5 shows focus error detection circuits 111 in FIG. 2 that includes an RF signal of focusing from the OPU 102 passes through an envelope detector 506 and a low pass filter 507 to comparators 503 and 504. In this invention, two thresholds 501 and 502 set by SMP 109 are used to distinguish the RF signal is considered as an error by comparator 504 or considered as no media detected by comparator 503 that is used in media control circuit 106 in FIG. 2. The FE signal goes to the servo-gain control 509 with DA converter 508 and phase compensator 510 for further transmitting to the focus driver circuit 113. The FE signal at phase compensator 501 is also inputted to the SMP 109 for further use in additional processes and for storage as shown in FIGS. 7 and 10 for focusing servo modulation control in large defect or discontinued track segment environment.

Figure 6:
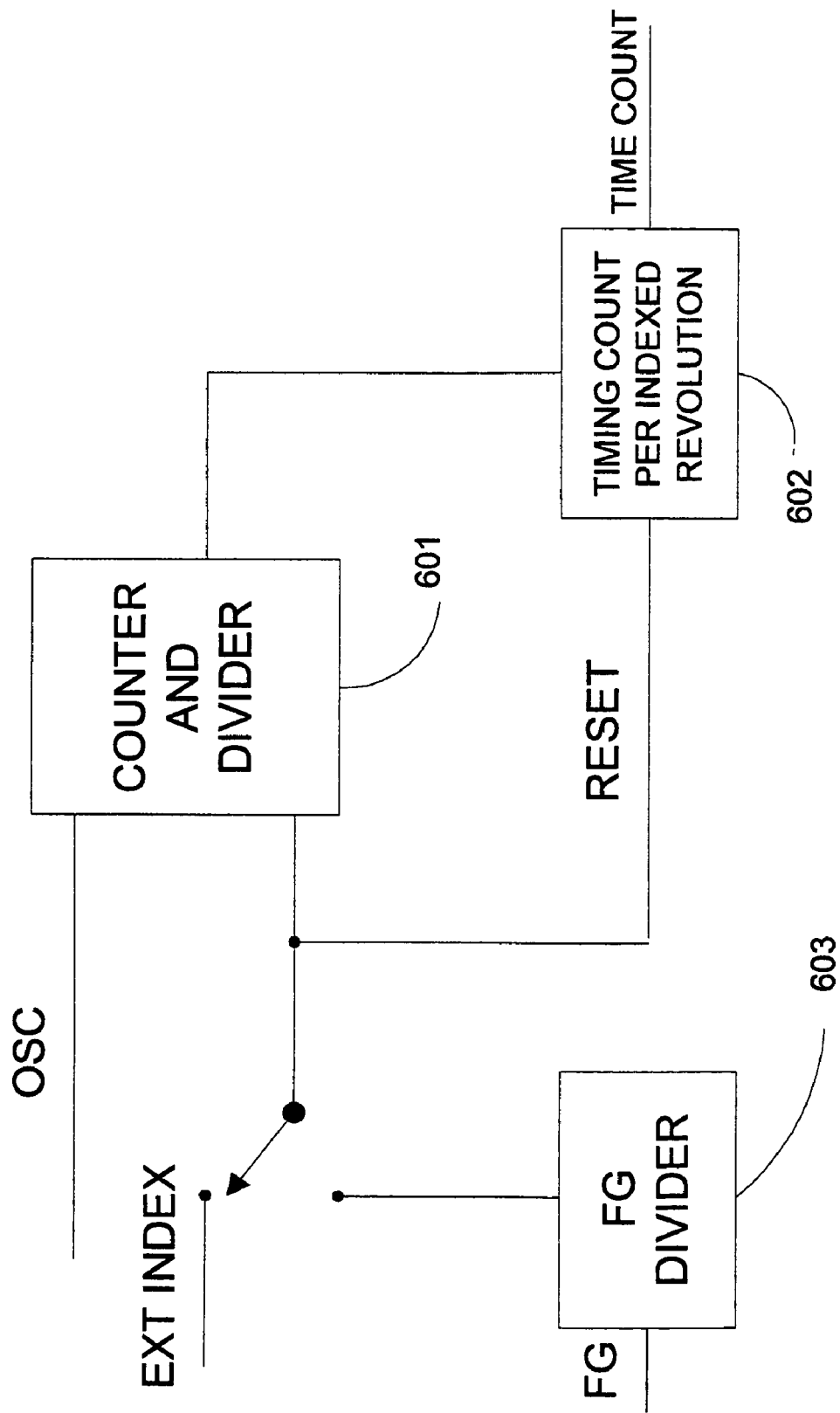
FIG. 6 shows the external index or spindle motor FG signal and timing counters.

FIG. 6 shows an external index is fed to a timing-and-counter circuit 108 in FIG. 2. The circuit 601 divides the index-to-index time to a predetermined number of counts N. A counter 602 counts starting from index and input real time count (0 to N) to SMP 109 detailed in FIGS. 7 and 10. If no external index is used, circuit uses the FG signal from spindle motor driver switched in by a switch. There are number of FG per revolution from spindle motor drive as M. Circuit 603 divides the FG signals by M to get the once around index. This kind of FG generated index varies its relative physical position when the spindle motor restarted. This invention uses the derived timing counter as marks for defect location or segmented track range for SMP 109 to manage the servo control in defect or segmented track environment as shown in FIGS. 7 and 10.

Figure 7:
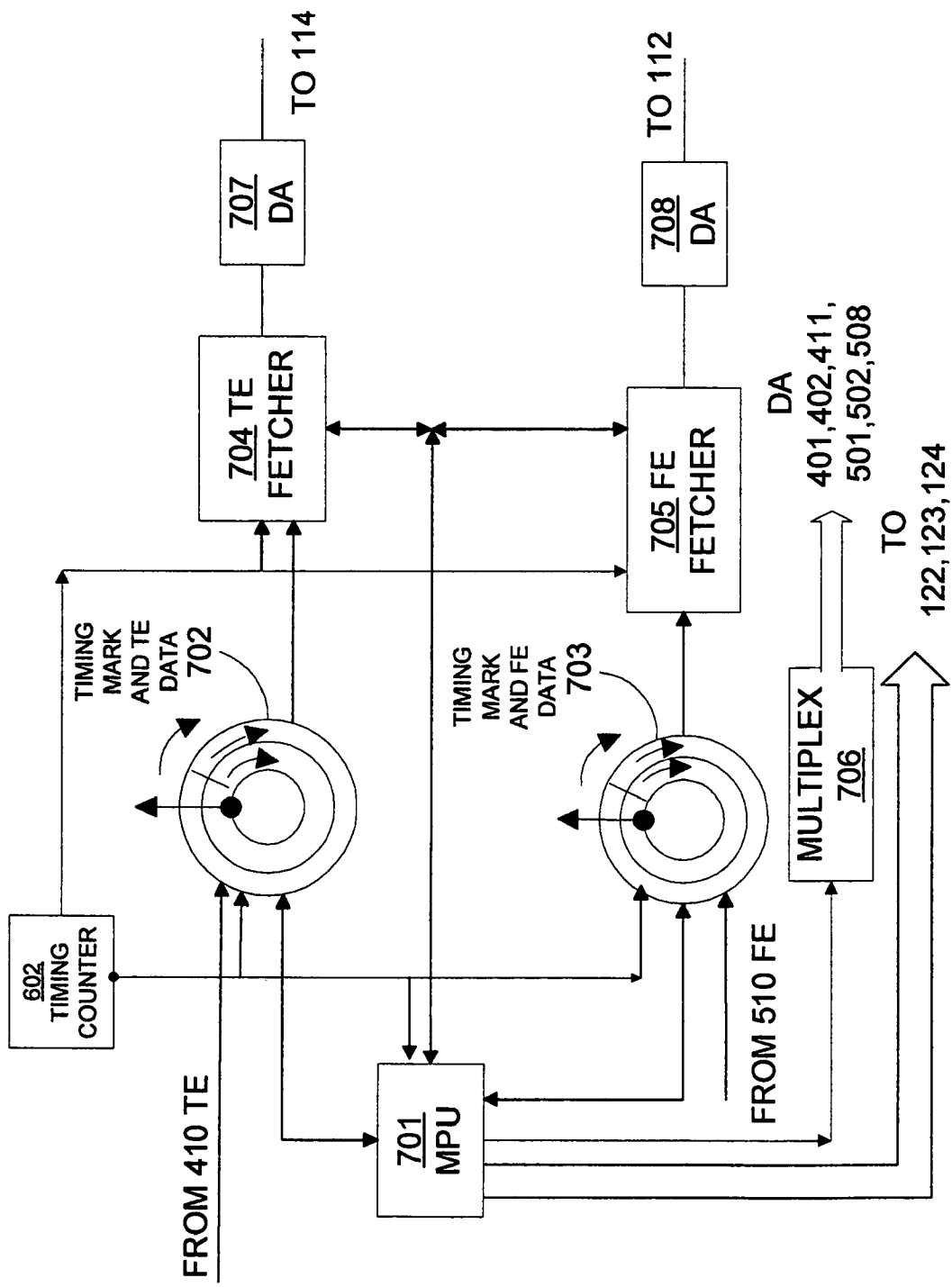
FIG. 7 shows block diagram of servo management processor and memory arrangement.

FIG. 7 shows the detail arrangement of the circuit SMP 109 and memory as that shown in FIG. 2. A MPU 701 interfaces with different signals and memory usages. Memories 702 and 703 are in round robin circular configuration with once around index as starting point. Each memory stores timing counter mark from 602 in FIG. 6 and servo control voltage values from 410 in FIG. 4 and from 510 in FIG. 5. Memory circuits 702 and 703 start with all zero values when a newly placed media is detected by 106 from FIG. 2. Memory 702 automatically stores the timing mark counter value from 602 in FIG. 6 and the FE control voltage values from 510. If a FE error flag is recognized, the memory 702 skips the update of control voltage value at the respected timing mark pointed location. Circuit fetcher 704 also fetches the FE servo control voltage value from 510 by matching the current timing mark time with the stored timing mark to a D/A converter 707. MPU 701 can override the automatically fetch of data by fetcher 704 and supply a MPU supplied value. Such value can be a calculated estimated control value from previously stored history. MPU 701 also use switch 124 shown in FIG. 2 to shut off the FE signal to focus servo circuits 105 in FIG. 2 and let the servo circuit 105 to hold all its latest loop values. MPU 701 also uses switch 122 in FIG. 2 to control the control values to adder 112 in FIG. 2 is combination of 105 and 707 or just a selected 105 or 707.

Similarly, memory 703 automatically stores the timing mark counter value from 602 in FIG. 6 and the TE control voltage values from 410 in FIG. 4. If a defect is recognized, memory 703 skips the update of control voltage value from 410 at the respected timing mark pointed location. Circuit fetcher 708 also fetches the TE servo control voltage value from 410 by matching the current timing mark time with the stored timing mark to a D/A converter 708. MPU 701 can override the automatically fetch of data by fetcher 705 and supply a MPU supplied value. Such value can be a calculated estimated control value from previously stored TE control history. MPU 701 also use switch 123 in FIG. 2 to shut off the TE signal to track servo circuits 104 in FIG. 2 and let the servo circuit 104 in FIG. 2 to hold all its latest loop values. MPU 701 also uses switch 121 in FIG. 2 to control the control values to adder 114 in FIG. 2 is the combination of 104 in FIG. 2 and 708 or just a selected 104 or 708. MPU 701 also uses the defect type information from 403 and 404 in FIG. 4 to set the high, low gain, or shut off gain at 411 to circuit 409 in FIG. 4. A normal servo gain applies when there is no defect detected. MPU 701 set different threshold values to D/A converters 401, 402, and 411 in FIG. 4, 501 and 502, and 508 in FIG. 5 through circuit matrix 706. MPU 701 also use the information stored to separate the real defect that the defect type is repeatable at a logged timing location, or it is an external disturbance. FIG. 7 shows this invention to modulated servo signal across a defect of discontinued track segment area.

Figure 9:
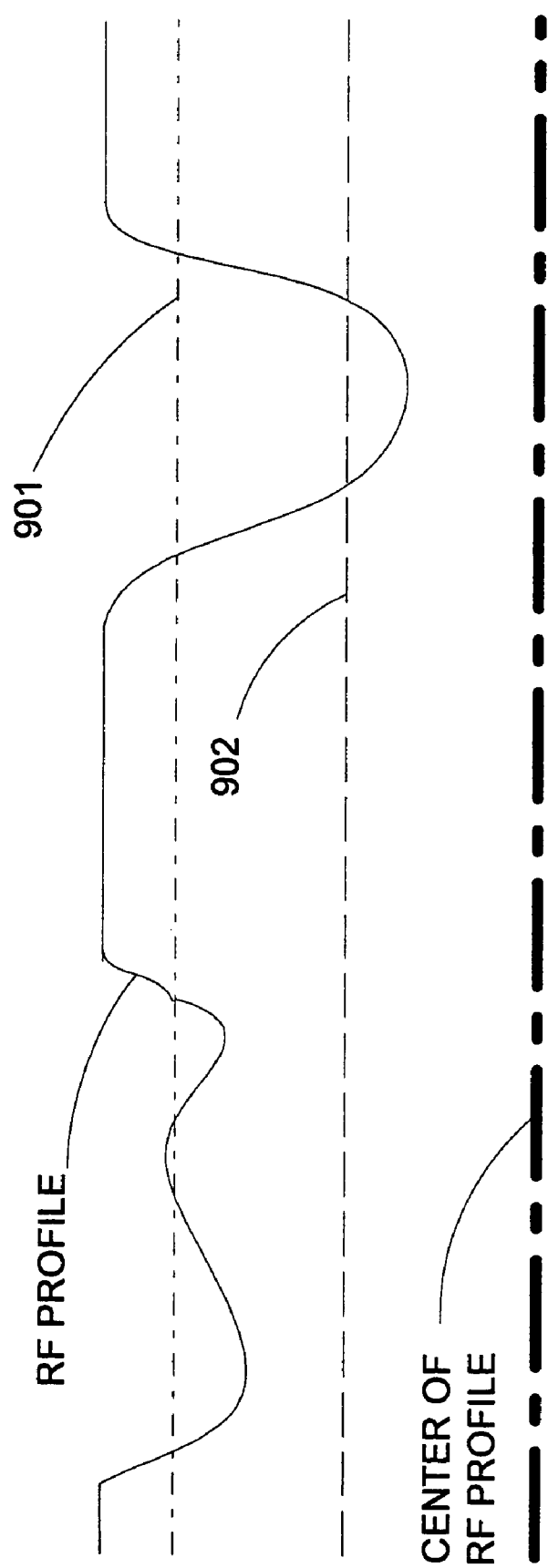
FIG. 9 shows an expanded RF signal profile and defect type threshold relationships.

FIG. 8A shows an example RF signal and envelop profile measured after at low pass filter 407 shown in FIG. 4 as part of circuit 110 in FIG. 2 or after at low pass filter 507 shown in FIG. 5 as part of circuit 111 in FIG. 2. Region 801 modulation is caused by an external disturbance. The signal degradation shown in Region 802 is caused by a minor defect. Region 803 signal drop is caused by a real serious defect that no reflection light beam back to OPU 102. All this regions can be small or very large or ling in time. In the case at non-continuous track segment as shown in FIG. 3, the region 803 is very extensive long. In a servo control mode, FIG. 8B measured at 404 in FIG. 4 shows the defect type 2 response and set active 813 respective to 803 in FIG. 8A. FIG. 8C measured at 403 in FIG. 4 shows the defect type 1 circuit response to set active as 821, 822, and 823 respectively to 801, 802, and 803 in FIG. 8A. Since the type-2 threshold is lower than the threshold for defect type 1, type 2 detection does not respond to signals represented by regions 801 and 802. FIG. 9 shows an expanded track envelope profile of FIG. 8A and the relative defect type thresholds type 1 and type 2, 901 is for type 1 and 902 is for type 2. The invention uses type 1 and type 2 defect information to control tracking and focusing servo for further processing with SMP 109 in FIG. 2 that can provide further tracking servo modulation control in large defect or discontinued track segment environment as explained in FIGS. 7 and 10.

For a non-continuous track segment arrangement showed in FIG. 3, FIG. 10 shows an added circuit 1006 to circuits in FIG. 7 for track start (TS) 1007 and track end (TD)1008 signals. MPU 701 uses TS 1007 and TD 1008 for additional control to all circuits as OPU 102 in FIG. 2 is in or out of the active region that has physical tracks. Servo circuits must react differently if it is following an active physical track or no existing physical tracks. Circuit 1006 provides such active and non-active track region information. Memory circuits 702 and 703 store or update data only from time mark trigged by TS 1007 and stop at TD 1008. MPU 701 set the switch 123 and 124 in FIG. 2 on to activate servo circuits after detect the signal 407 in FIG. 4 and with the timing counter information from 108 in FIG. 2 to turn off the switch 123 and 124 before signal TD 1008 becomes active or it is in a non track region. After the switch 123 and 124 in FIG. 2 become off in non-track region, MPU can either hold servo drivers 113 and 115 in FIG. 2 at their current values from 104 in FIG. 2 or 410 in FIG. 4 and 105 in FIG. 2 or 510 in FIG. 5, feeds a calculate and predicated value through the 704, 707 and 705 and 708 in FIG. 7 or 10, or modulates servo control with the combination of holding previous value and the calculated values through switches 121, 122 and adders 112 and 114 in FIG. 2. This invention achieves a stable tracking and focusing servo control in a full circular way just as a full physical track is available.

Figure 1:
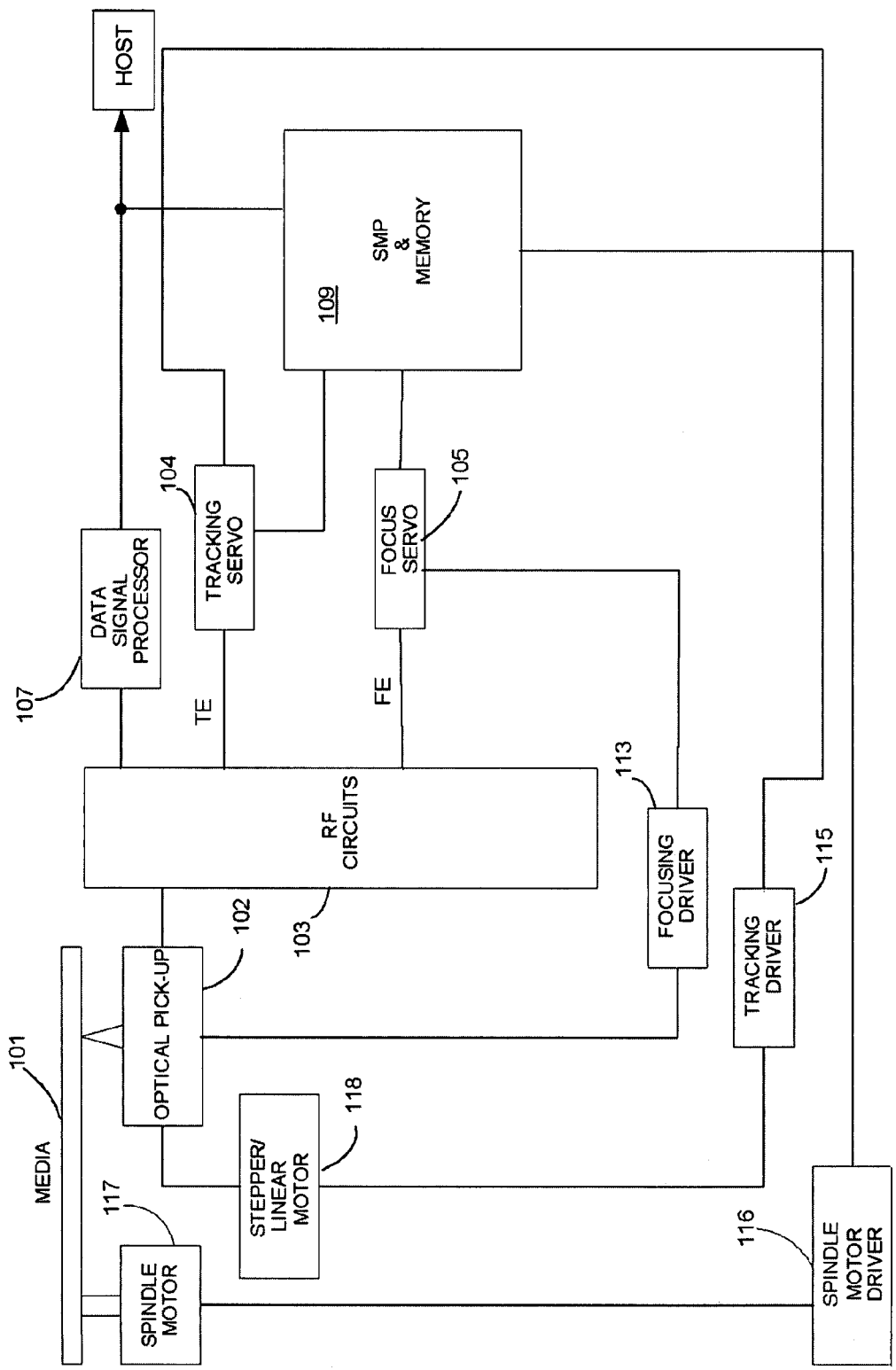
FIG. 1 shows a servo control circuit that is typically implemented in a conventional data storage system.
Figure 11:
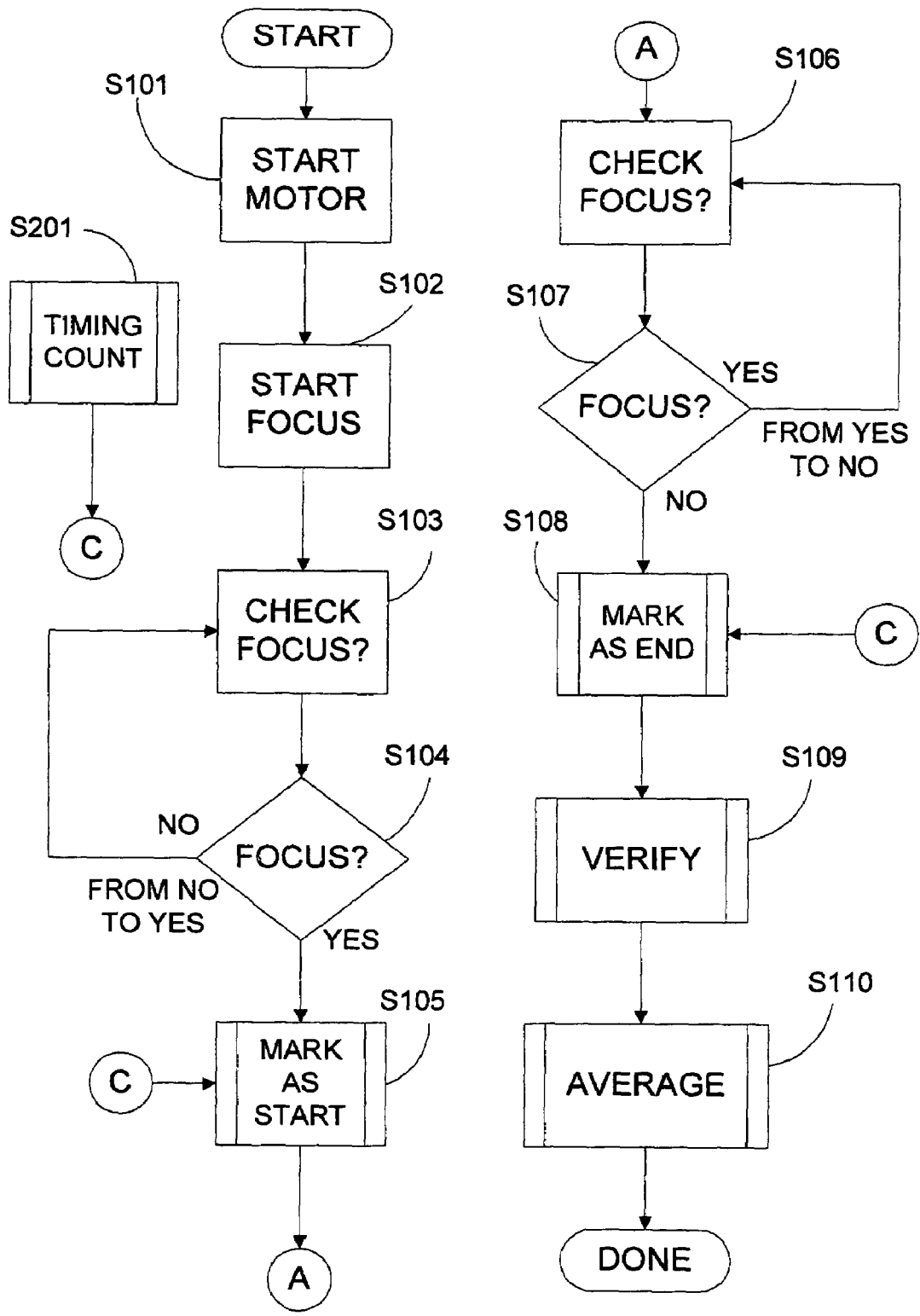
FIG. 11 shows the generating pseudo track start and track end index for a non-continuous track segment.

In case no external track start TS and track end TD signal are available in a non-continuous track segment arrangement, with MPU 701 in FIG. 7 or 10, this invention can use available focusing FE signal from 507 in FIG. 5 to define such signal as pseudo tack start and track end signals. FIG. 11 shows an algorithm. MPU 701 spins up the media 101 in FIG. 2 in process S101 and turn on the Focusing part of OPU 102 in FIG. 2 at process S102. Process S103 checks the availability of focusing signal FE, A FE signal becomes active at 507 in FIG. 5. At the non-reflective region, there is no optical tracks available and focus signal is not active or signal amplitude is very small or none at 507 in FIG. 5. Process 104 determines the FE becomes form inactive to active. Once the media track area starts to pass under the OPU 102 and the FE becomes active, at process S105, MPU 701 can set the mark as track start TS signal using timing mark location generated at 108 in FIG. 2 from process S201. Once the track region passes over the OPU 102, the FE becomes as inactive. Process S106 and S107 determine that the FE is becoming from active to inactive. MPU 701 can use the timing mark counter 108 in FIG. 1 again from process S201 as reference and subtracting a predetermined value to mark it as a track end. As the media kept spinning, when ever the timing counter matches these two marked counter position, the track start and track end conditions are signaled. Process S109 verifies the repeatability of the measured TS and TD are with in a predetermined tolerance. Process S110 can take an average value by eliminating bad measurement. The pseudo TS and TD are determined and can be used in the servo control modulation in FIG. 7 or 10.

This invention discloses a control circuit for servo-controlling a data access pickup head that includes a defect type determination means for comparing an error signal with a defect threshold for determining at least two types of data track defects. In a preferred embodiment, the defect type determination means activating an extended recovery control process for managing a servo control of a defect type of an extended defect. In a preferred embodiment, the defect type determination means activating an external disturbance control process for managing a servo control of an external disturbance. In a preferred embodiment, the defect type determination means maintaining a normal servo control process when a error signal is below a threshold value.

This invention further discloses a control circuit for servo-controlling a data access pickup head that includes a track index determination means for controlling a servo control for accessing data on a segmented non-continuous data track.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A tracking and focusing servo circuit for controlling a tracking and focusing of an optical pickup head on an optical media, wherein said tracking and focusing servo circuit is provided to receive a tracking and focusing error signal and a loop gain control signal from an RF signal generated from said optical pickup head, said tracking and focusing servo circuit further comprising:

a memory circuit and a timing counter circuit for processing and storing a tracking and focusing profile and a modulation circuit for emulating a tracking and focusing profile for a selected segment of a data track wherein said timing counter circuit and said modulation circuit are controlled to continue a tracking and focusing function when said optical pickup head scans over an empty area due to a large defect or discontinuous track without a feedback signal.

2. The tracking and focusing servo circuit of claim 1 wherein:

said memory circuit and timing counter circuit process a defect or disturbance type by using a timing mark reference to continue said tracking and focusing function without said feedback when said pickup head scans over said empty area.

3. The tracking and focusing servo circuit of claim 1 wherein:

said memory circuit and timing counter circuit emulate a tracking and focusing profile by using a timing mark reference to continue said tracking and focusing function without said feedback when said pickup head scans over said empty area.

4. The tracking and focusing servo circuit of claim 1 wherein:

said memory circuit and timing counter circuit emulate a tracking and focusing profile to continue said tracking and focusing function without said feedback when said pickup head scans over said empty area.

5. The tracking and focusing servo circuit of claim 1 wherein:

said memory circuit and timing counter circuit locate a defect by a timing mark to continue said tracking and focusing function without said feedback when said pickup head scans over said empty area.

6. The tracking and focusing servo circuit of claim 1 wherein:

said memory circuit and timing counter circuit locate a track start and a track end of a segmented data track with a timing mark to continue said tracking and focusing function without said feedback when said pickup head scans over said empty area before said track start or after said track end.

7. A tracking and focusing servo circuit for controlling a tracking and focusing of an optical pickup head on an optical media, wherein said tracking and focusing servo circuit is provided to receive a tracking and focusing error signal and a loop gain control signal from an RF signal generated from said optical pickup head, said tracking and focusing servo circuit further comprising:

a memory circuit for storing a tracking and focusing profile and a modulation circuit for emulating a tracking or focusing profile at a selected portion of a data track wherein said memory circuit and said modulation circuit are controlled to continue a tracking and focusing function when said optical pickup head scans over an empty area due to a large defect or discontinuous track without a feedback signal.

8. The tracking and focusing servo circuit of claim 7 wherein:

said memory circuit further includes a timing counter circuit processing a defect or disturbance type by using a timing mark reference to continue said tracking and focusing function without said feedback when said pickup head scans over said empty area.

9. The tracking and focusing servo circuit of claim 7 wherein:

said memory circuit further includes a timing counter circuit emulating a tracking and focusing profile using a timing mark reference to continue said tracking and focusing function without said feedback when said pickup head scans over said empty area.

10. The tracking and focusing servo circuit of claim 7 wherein:

said memory circuit further includes a timing counter circuit emulating a tracking and focusing profile to continue said tracking and focusing function without said feedback when said pickup head scans over said empty area.

11. The tracking and focusing servo circuit of claim 7 wherein:

said memory circuit further includes a timing counter circuit locating a track start and a track end of a segmented data track to continue said tracking and focusing function without said feedback when said pickup head scans over said empty area before said track start or after said track end.

12. The tracking and focusing servo circuit of claim 7 wherein:

said memory circuit further includes a timing counter circuit locating a defect by a timing mark to continue said tracking and focusing function without said feedback when said pickup head scans over said empty area due to said defect.

* * * * *